United States Patent
Wadman et al.

(10) Patent No.: US 12,354,451 B2
(45) Date of Patent: Jul. 8, 2025

(54) METHOD AND DEVICE FOR THEFT AND STALKER PROTECTION

(71) Applicant: Sony Group Corporation, Tokyo (JP)

(72) Inventors: Johan Wadman, Lund (SE); Peter Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 64 days.

(21) Appl. No.: 18/132,881

(22) Filed: Apr. 10, 2023

(65) Prior Publication Data

US 2023/0343197 A1 Oct. 26, 2023

(30) Foreign Application Priority Data

Apr. 26, 2022 (SE) .................................. 2250501-0

(51) Int. Cl.
*G08B 13/24* (2006.01)
*G06F 21/88* (2013.01)

(52) U.S. Cl.
CPC ............. *G08B 13/24* (2013.01); *G06F 21/88* (2013.01)

(58) Field of Classification Search
CPC ................................. G08B 13/24; G06F 21/88
See application file for complete search history.

(56) References Cited

U.S. PATENT DOCUMENTS

| | | | | |
|---|---|---|---|---|
| 11,011,036 | B2* | 5/2021 | Madden | G08B 13/19608 |
| 2015/0310727 | A1* | 10/2015 | Beaulieu, Jr. | G08B 25/016 340/539.13 |
| 2018/0184286 | A1* | 6/2018 | Patterson | H04W 12/02 |
| 2021/0065155 | A1* | 3/2021 | Trivelpiece | G06Q 20/326 |
| 2022/0030081 | A1 | 1/2022 | Klinkner | |
| 2023/0016477 | A1* | 1/2023 | Klinkner | H04W 64/003 |
| 2023/0260384 | A1* | 8/2023 | Haines | H04W 8/16 455/411 |

OTHER PUBLICATIONS

Office Action and Search Report from corresponding Swedish Application No. 2250501-0, mailed on Oct. 26, 2022, 9 pages.
Apple Inc., "An update on AirTag and unwanted tracking," Feb. 10, 2022, 4 pages.

* cited by examiner

*Primary Examiner* — Thomas D Alunkal
(74) *Attorney, Agent, or Firm* — Tucker Ellis LLP

(57) ABSTRACT

A method of determining an appropriate tracking device response scheme includes obtaining, from a tracking device, a tracking parameter indicative of the tracking device being within a vicinity of the user equipment. The method determines, based on the tracking parameter, a verification parameter indicative of an identity associated with the user equipment. The method determines whether the verification parameter meets a verification criterion indicative of a stalker tracking device. In accordance with a determination that the verification parameter meets the verification criterion, the method applies a stalker response scheme.

20 Claims, 4 Drawing Sheets

METHOD AND DEVICE FOR THEFT AND STALKER PROTECTION

RELATED APPLICATION DATA

The present application claims priority to Swedish Patent Application No. 2250501-0, filed Apr. 26, 2022, the content of which is incorporated herein by reference in its entirety.

TECHNICAL FIELD

The present disclosure pertains to the field of tracking technology communications. The present disclosure relates to a method for determining an appropriate tracking device response scheme and a related device.

BACKGROUND

Many companies provide tracking devices, such as tracking tags, for valuable items. These tracking devices are cheap, small, and quite effective to track items globally. Stolen items have even been known to be tracked over country borders using this technology. Accordingly, tracking devices can be effective anti-theft devices.

The effectiveness of these tracking devices can, however, also be misused. A primary misuse is to use these tracking devices to stalk people. There are "anti-stalker" measures implemented to avoid this kind of misuse, such as: 1) the tracking device will beep after certain time period (then every 6 hours, for example) after it has been determined to be "lost", and 2) the user that is moving together with a rouge tag will be notified that a rouge tracking device is present. This of course requires that the user has a compatible phone with sufficient app and services enabled.

SUMMARY

Accordingly, there is a need for devices and methods for determining an appropriate tracking device response scheme, which may mitigate, alleviate or address the shortcomings existing and may provide for appropriate tracking device response schemes according to the situation.

A method is disclosed, for determining an appropriate tracking device response scheme, performed by a user equipment. The method comprises obtaining, from a tracking device, a tracking parameter indicative of the tracking device being within a vicinity of the user equipment. The method comprises determining, based on the tracking parameter, a verification parameter indicative of an identity associated with the user equipment. The method comprises determining whether the verification parameter meets a verification criterion indicative of a stalker tracking device. In accordance with a determination that the verification parameter meets the verification criterion, the method comprises applying a stalker response scheme.

Further, a user equipment is provided. The user equipment comprises memory circuitry. The user equipment comprises a wireless interface. The user equipment comprises processor circuitry. The processor circuitry is configured to obtain, from a tracking device, a tracking parameter indicative of the tracking device being within a vicinity of the user equipment. The processor circuitry is configured to determine, based on the tracking parameter, a verification parameter indicative of an identity associated with the user equipment. The processor circuitry is configured to determine whether the verification parameter meets a verification criterion indicative of a stalker tracking device. In accordance with a determination that the verification parameter meets the verification criterion, the processor circuitry is configured to apply a stalker response scheme.

Moreover, a tracking device is disclosed. The tracking device comprises memory circuitry. The tracking device comprises a wireless interface. The tracking device comprises processor circuitry. The processor circuitry is configured to transmit a tracking parameter indicative of the tracking device being within a vicinity of a user equipment, wherein transmitting is on a non-standardized protocol.

It is an advantage of the present disclosure that a degradation of anti-theft features for a tracking device can be limited when anti-stalker features, such as a stalker response, are implemented. In particular, the disclosure can allow for a determination about whether a stalker response scheme is appropriate, which may limit any anti-theft features. For example, the present disclosure can differentiate between criminal users, and the type of criminal user, and regular users and apply the necessary scheme for criminal users. Further advantages include increasing the difficulty of unauthorized phones from detecting tracking devices.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
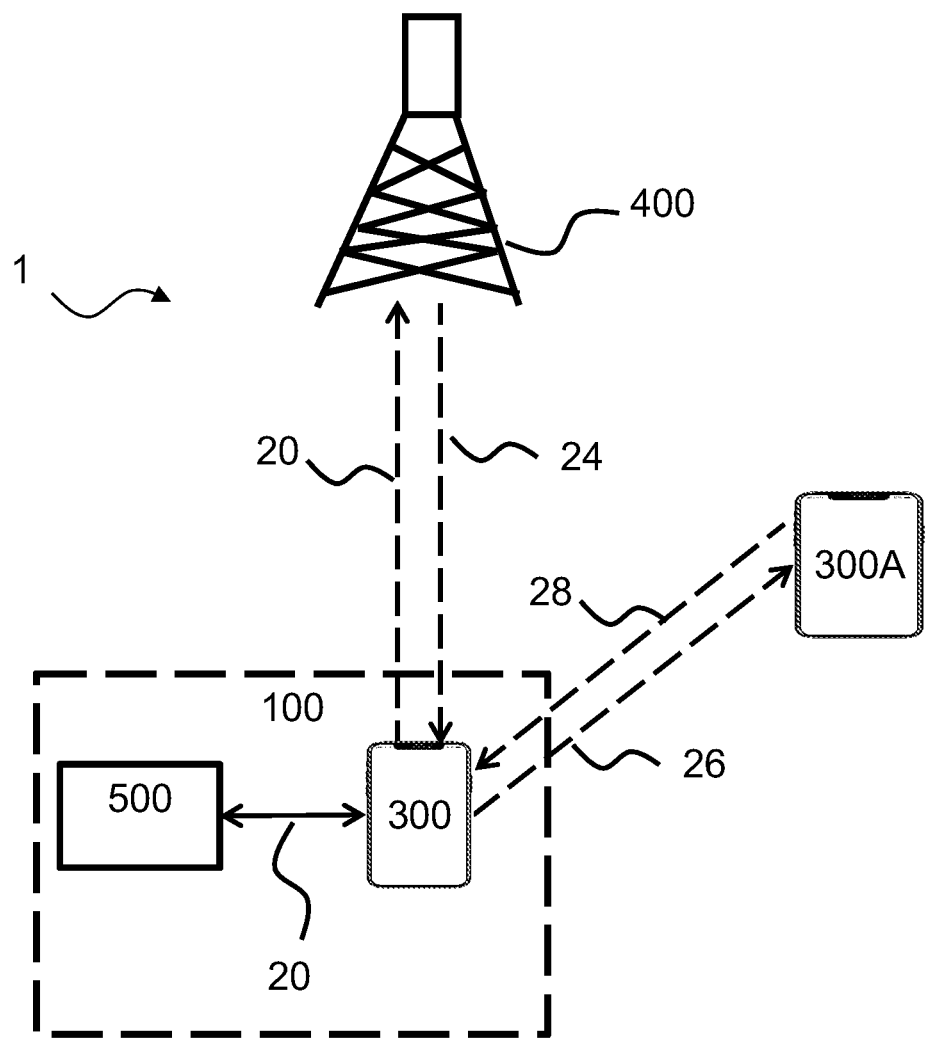
FIG. 1 is a diagram illustrating an example tracking device communication system comprising an example network node, an example user equipment, and an example tracking device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are devices and methods for limiting degradation of anti-theft features provided for assets when anti-stalker features are implemented. For tracking devices to be effective against theft, it should not be trivial to detect and remove tracking devices from stolen items. However, enabled anti-stalker features can make it easy for thieves to detect if a tracking device is attached to stolen items, such as by causing an auditory notification from the tracking device, leading to conflict between the anti-theft and anti-stalking features. The devices and methods according to the disclosure can maintain anti-stalker features while still making it hard for thieves to detect tags on stolen items. Accordingly, the devices and methods according to the disclosure may determine when anti-stalking features can be used and when they cannot be used.

For example, the devices and methods according to the disclosure can limit anti-stalker features to regular users and make them un-attractive to criminals. Further, the devices and methods according to the disclosure can use anti-theft features if a non-regular user acquires the tracking device. Further, the devices and methods according to the disclosure can make it hard to scan tracking devices from any unauthorized phone app, making it difficult for thieves to detect tracking devices on stolen goods.

Advantageously, tracking devices are generally tracked, in some fashion, at all times. For example, any nearby mobile phones may identify tracking devices in their area, which may create a dynamic environment for tracking device monitoring. This can allow user equipment to monitor tracking devices for determination of whether to use anti-stalking features or non-anti-stalking in a quick and efficient manner.

A rouge tracking device may be a tracking device that a user of adjacent user equipment is not aware of. For example, a rogue tracking device may be slipped into an item, such as a purse, bag, etc., by a stalker. As another example, a rogue tracking device may be a tracking device unnoticed by a thief on a stolen good.

The term rogue tracking device and tracking device can be utilized interchangeably herein.

The figures are schematic and simplified for clarity, and they merely show details which aid understanding the disclosure, while other details have been left out. Throughout, the same reference numerals are used for identical or corresponding parts.

FIG. 1 is a diagram illustrating an example tracking technology communication system 1. The tracking technology communication system 1 comprises an example user equipment 300 and/or optionally a network node 400. A user equipment 300 may refer to a wireless device, such as a mobile device.

A network node disclosed herein refers to a radio access network node operating in the radio access network, such as a base station, an evolved Node B, eNBs, a global Node B, gNBs.

In particular, an example user equipment 300 is disclosed, and can be used in the tracking technology communication system 1. As discussed in FIG. 3, the user equipment can include memory circuitry 301, processor circuitry 302, and a wireless interface 303.

The user equipment 300 can be configured to obtain, from a tracking device 500, a tracking parameter 20 indicative of the tracking device 500 being within a vicinity 100 of the user equipment 300. The user equipment 300 can be configured to determine, based on the tracking parameter 20, a verification parameter indicative of an identity associated with the user equipment 300. The user equipment 300 can be configured to determine whether the verification parameter meets a verification criterion indicative of a stalker tracking device. In accordance with a determination that the verification parameter meets the verification criterion, the user equipment 300 can be configured to apply a stalker response scheme.

In one or more example user equipment, in accordance with a determination that the verification parameter does not meet the verification criterion, the user equipment 300 can be configured to not apply the stalker response scheme. In one or more example user equipment, in accordance with a determination that the verification parameter does not meet the verification criterion, the user equipment 300 can be configured to apply a theft response scheme.

In one or more example user equipment, a user equipment 300 may only be able to apply a theft response scheme or a stalker response scheme. In one or more example user equipment, applying a theft response scheme can include not-applying a stalker response scheme and/or stopping any applying of a stalker response scheme.

As an example, upon application of a stalker response scheme by user equipment 300, the tracking device 500 may make an auditory notification. This can provide an alert that an unknown tracking device is in a user's possession. However, making an auditory notification may not be useful if a thief steals an item with the tracking device, as it would allow the thief to find and remove the tracking device 500. Accordingly, the stalker response scheme and the theft response scheme may require opposite actions, and both could not be applied simultaneously. The user equipment 300 may be configured apply a theft response scheme as an initial matter. Upon a determination that the verification parameter meets the verification criterion, the user equipment 300 may apply the stalker response scheme and un-apply the theft response scheme.

In one or more example user equipment, the network node 400 can be configured to take one or more of the above-discussed actions. For example, the user equipment 300 can be configured to obtain, from a tracking device 500, a tracking parameter 20 indicative of the tracking device 500 being within a vicinity 100 of the user equipment 300. The user equipment 300 can transmit the tracking parameter to the network node 400. The network node 400 can be configured to determine, based on the tracking parameter 20, a verification parameter indicative of an identity associated with the user equipment 300, such as a user. The network node 400 can be configured to determine whether the verification parameter meets a verification criterion indicative of a stalker tracking device. In accordance with a determination that the verification parameter meets the verification criterion, the network node 400 can be configured to transmit a configuration message 24 to the user equipment 300 to apply a stalker response scheme.

In one or more example network nodes, in accordance with a determination that the verification parameter does not meet the verification criterion, the network node 400 can be configured to transmit a configuration message 24 to the user equipment 300 to not apply a stalker response scheme. In one or more example network nodes, in accordance with a determination that the verification parameter does not meet the verification criterion, the network node 400 can be configured to transmit a configuration message 24 to the user equipment 300 to apply a theft response scheme.

The user equipment 300 may be a thief who has stolen an item with tracking device 500. The user equipment 300 may be an innocent user being stalked using the tracking device 500. The disclosure may be applied by user equipment 300 automatically, so that the user equipment 300 may not be notified. A user of the user equipment 300 may be notified of any of the actions discussed with respect to this disclosure.

The tracking parameter 20 can be indicative of a tracking device 500, such as a tracking tag, tracking chip, tracker, being within a vicinity 100 of the user equipment 300. The tracking parameter 20 may be a received signal strength indication (RSSI). The user equipment 300 may obtain the tracking parameter 20 via RSSI detection.

For example, the tracking parameter 20 can indicate when the tracking device 500 is within a certain distance from the user equipment 300. The vicinity 100 can be an area around the tracking device 500. The vicinity 100 can be a maximum signal distance between the tracking device 500 and the user equipment 300, such as a Bluetooth range of the tracking device 500. The vicinity 100 can be less than a maximum signal distance between the tracking device 500 and the user equipment 300. A user of the tracking device 500 may set the size of the vicinity 100. A user of the user equipment 300 may set the size of the vicinity 100.

When a user equipment 300 comes near enough to the tracking device 500 to be within the vicinity 100, the user equipment 300 can discover the tracking device 500 by obtaining the tracking parameter 20. For example, the user equipment 300 can send a discovery signal that can be received by the tracking device 500. The tracking device 500 can send a discovery signal that can be received by the user equipment 300. Once the tracking device 500 has been discovered by the user equipment 300, the user equipment 300 can obtain the tracking parameter 500.

In one or more example user equipment, the user equipment 300 determines whether the tracking device 500 is in the vicinity for a period of time. For example, the tracking device 500 may meet a time threshold in accordance with the tracking device 500 being in the vicinity 100 of user equipment 300 for a period of time. In accordance with the tracking device 500 being in the vicinity of the user equipment 300 at or above a time threshold, the user equipment 300 can be configured to obtain the tracking parameter 20. In accordance with the tracking device 500 being in the vicinity of the user equipment 300 below a time threshold, the user equipment 300 can be configured to not obtain the tracking parameter 20. This can allow the user equipment 300 to differentiate random tracking tags from one that is actually following the user equipment 300.

The tracking parameter 20 may include identifying information of the tracking device 500. The tracking parameter 20 may be indicative of a nearby tracking device 500. The tracking parameter 20 may include location information of the tracking device 500. The user equipment 300 may not be notified of the obtained tracking parameter 20 until further determinations are made by the user equipment 300.

Once the user equipment 300 is in the vicinity of the tracking device 500 and has obtained the tracking parameter 20, the user equipment 300 can be configured to verify the user equipment 300. This may allow a differentiation between a criminal user and a regular user that wants to use stalking response features.

For example, the verification parameter can be used. The verification parameter can be associated with, such as indicative of, the user equipment 300. The verification parameter can include one or more distinguishing features of the user associated with the user equipment 300. The verification parameter can be indicative of one or more of: name, birthday, password, email, and address of the user associated with the user equipment 300.

For example, the stalker response scheme can be an opt-in feature which may only be enabled if the user identity of all devices used for stalker detection is verified. Specifically, the stalker response scheme can be an opt-in feature which may only be enabled if the user identity of the user equipment 300 is verified. Accordingly, to be notified of rouge tracking devices, a user equipment 300 may need to have securely identified the user. This can be done through any secure personal identification process. The user equipment 300 can be configured to obtain opt-in information, such as from a database and/or network node 400. The user equipment 300 can have the opt-in information stored on the user equipment.

In accordance with the verification parameter being indicative of a verified user, the user equipment can be configured to determine that the verification parameter meets the verification criterion indicative of a stalker tracking device. This allows a regular user to opt-in to stalking response features, such as the stalking response scheme.

In accordance with the verification parameter being indicative of a verified user, the user equipment can be configured to determine that the verification parameter does not meet the verification criterion. An unverified user would not opt-in to stalking response features, and therefore may be a thief.

The user device 300 may use one or more verification criterion for determining an appropriate scheme to apply. For example, the verification criterion may be indicative of whether the user equipment 300 has opted-in to a stalker response scheme, thus allowing for the user equipment 300 to apply the stalker response scheme. If the verification criterion is not indicative of an opt-in of the user equipment 300, the user equipment 300 can determine that the verification criterion is not met. If the verification criterion is indicative of an opt-in by the user equipment 300, the user equipment 300 can determine that the verification criterion is met.

As stalker response schemes and theft response schemes may be counterproductive between one another, it can be advantageous to apply the correct scheme. The user equipment 300 can be configured to determine whether or not to apply a stalker response scheme. For example, the user equipment 300 can be configured to apply one of the stalker response scheme and the theft response scheme based on the verification parameter meeting the verification criterion.

Examples of stalker response schemes can include having the tracking device 500 make a sound. Further stalker response schemes can include one or more of: the user equipment displaying alerts and the user equipment actively scanning for any tracking devices. The stalker response scheme can include the user equipment 300 providing a notification when near the owner of the tracking device 500. For example, after applying a stalker response scheme, the user equipment 300 can be configured to detect and/or determine that the tracking device 500 is being used for stalking, such as by determining if the tracking device 500 is associated with a different user equipment, such as user equipment 300A. The user equipment 300 can be configured to provide a notification that the tracking device 500, being used by a stalker, has been found. The notification can be performed, such as via an alarm sound, by the tracking device, or via a notification on the user equipment 300, such as a message, note, etc.

The theft response scheme, if used, can include any known anti-theft scheme. For example, unlike stalker response schemes, the user equipment 500 may not provide instructions for the tracking device 500 to make any noise, which may enable a thief to find and remove the tracking device 500. The tracking device 500 may store movement data of the tracking device 500. The tracking device 500 may transmit location information and/or a stolen device indicator. Upon application of a thief response scheme, the tracking device 500 may not provide any notification, such as an audio notification. When a theft response scheme is applied by the user equipment 300, the stalker response scheme can be disabled, such as completely disabled. The user equipment 300 may not provide a notification about the user equipment applying the theft response scheme.

In one or more example user equipment, to determine whether the verification parameter meets the verification criterion includes to transmit device identification data 26 indicative of the identity associated with the user equipment 300 to a second user equipment 300A associated with the tracking device 500.

The identification data 26 can include one or more of: a name of the user associated with the user equipment 300, identifying information of the user associated with the user equipment 300, user identification of the user associated with the user equipment 300, and contact information of the user associated with the user equipment 300.

For example, when a rogue tracking device, such as tracking device 500, is detected on an enabled user device, such as user equipment 300, two things can happen. 1) The user equipment 300, carrying the rouge tracking device 500, can be informed about it; and/or 2) The user of the rouge tracking device 500, such as the user of user equipment 300A, can be able to access the identity of the user, via the identification data 26, that owns the user equipment 300 that detected the rouge tracking device 500.

If the user associated with user equipment 300 is a thief who has opted in for a stalker response scheme, they also know that their identity will be revealed to the owner of the goods (and/or the authorities) as soon as the rouge tracking device 300 is detected. This is likely a poor tradeoff for the thief, and they would not opt-in. Accordingly, the user equipment 300 would not enable the stalker response scheme as the verification criterion would not be met. For example, the user equipment 300 would enable the anti-theft scheme as the verification criterion would not be met.

If the user associated with user equipment 300 is a regular user who has opt in for a stalker response scheme, they also know that their identity will be revealed to the potential stalker, such as the user of user equipment 300A. Accordingly, the user equipment 300 would enable the stalker response scheme as the verification criterion would be met.

In one or more example user equipment, to determine whether the verification parameter meets the verification criterion comprises to receive second device identification data 28 indicative of an identity associated with the second user equipment 300A.

A second user equipment 300A may, for example, belong to a stalker. However, the second user equipment 300A may belong to a person known to the user 100 of the user equipment 300. For example, the user 100 of the user equipment 300 and the user 100A of the user equipment 300A may related to each other, such as may be married, and therefore the identities may be known.

The verification criterion when an identity of the user equipment 300 is revealed as part of detecting stalker tracking devices could be diversified further to make the trade-off better. For example, a mandate that the identity of the user associated with the tracking device 500 is known and verified can be used. A regular user of user equipment 300 may also receive information about the user associated with the tracking device 500. This information could be used to report misuse to tracking device manufacturer and/or authorities. For example, user identities of both parties can be shared between parties of the user equipment 300, 300A.

In one or more example user equipment, to determine whether the verification parameter meets the verification criterion comprises to obtain a lost parameter indicating that the tracking device has been lost. In one or more example user equipment, in accordance with a determination that the lost parameter is indicative of the tracking device 500 being lost, the user equipment 300 can determine that the verification parameter meets the verification criterion. In one or more example user equipment, in accordance with a determination that the lost parameter is indicative of the tracking device 500 being lost, to determine whether the verification parameter meets the verification criterion comprises to transmit device identification data indicative of the identity associated with the user equipment 300 to a second user equipment 300A associated with the tracking device 500.

A lost parameter may be indicative of the tracking tag 500 being lost, such as being stolen. A user registered with the tracking tag 500 may report the tracking tag 500 as being lost. Until the lost parameter is indicative of the tracking device 500 being lost, the user equipment 300 may not apply the stalker response scheme. Thus, a second user equipment 300A would need to report the tracking tag as lost before they receive any information about the user equipment 300. A stalker would have to report the tag as stolen in order to receive information, and they may be disinclined to do so. The user equipment 300 may obtain the lost parameter, such as from a data base and/or a network node 400.

In one or more example user equipment, in accordance with a determination that the lost parameter is not indicative of the tracking device 500 being lost, the user equipment 300 can determine that the verification parameter does not meet the verification criterion. In one or more example user equipment, in accordance with a determination that the lost parameter is not indicative of the tracking device 500 being lost, to determine whether the verification parameter meets the verification criterion comprises to not transmit device identification data indicative of the identity associated with the user equipment 300 to a second user equipment 300A associated with the tracking device 500.

A stalker does not want to report a tracking device 500 as stolen if it is used for stalking someone, as it may reveal identifying details of the stalker. Therefore, a tracking device 500 indicated as lost would lead to the user equipment 300 applying an anti-theft scheme. A tracking device 500 indicated as lost would lead to the user equipment 300 not applying a stalker response scheme. A thief does not want to apply a stalker response scheme even if there are some restrictions on when the identity of the thief may be revealed. A regular user may want to apply a stalker response scheme even if their identity is revealed if the tracking device 500 has been reported stolen, and possibly also the identity of the owner of the tracking device 500 will be revealed in the process of successful stalker detection.

In one or more example user equipment, to determine whether the verification parameter meets the verification criterion comprises to obtain a secondary tracking parameter indicative of one or more secondary tracking devices in the vicinity of the tracking device 500. In one or more example user equipment, in accordance with the secondary tracking data meeting an item threshold parameter, to determine whether the verification parameter meets the verification criterion comprises to determine that the verification parameter does not meet the verification criterion. In one or more example user equipment, in accordance with the secondary tracking data not meeting an item threshold parameter, to determine whether the verification parameter meets the verification criterion comprises to determine that the verification parameter does meet the verification criterion.

The secondary tracking parameter may be indicative of a number of any tracking devices, such as tracking device 500, in the vicinity 100 of the user equipment 300. The secondary tracking parameter may be indicative of a number of any tracking devices other than the tracking device 500 being in the vicinity 100 of the user equipment 300.

The item threshold may be indicative of a number of tracking tags in the vicinity 100 of the tracking device 500. For example, thieves, having user equipment 300, that pick a lot of stolen goods, that are each tagged with a tracking device, will look very different from a regular user in terms of movement patterns and number of owned tags and rouge tags that surround and follow the user. Stalker response schemes may be disabled, and the user equipment 300 can activate a theft response scheme, for users profiled not to behave as regular users.

There may be a possibility to detect whether it is more likely that a tracking device 500 is being used by a stalker or a thief by looking at movement patterns of the user equipment 300 and/or the tracking devices 500.

In one or more example user equipment, to determine whether the verification parameter meets the verification criterion comprises to obtain a stored movement parameter indicative of stored movement of the tracking device 500. In one or more example user equipment, to determine whether the verification parameter meets the verification criterion comprises to determine a movement parameter indicative of movement of the tracking device 500. In one or more example user equipment, in accordance with a determination that the movement parameter meets, based on the stored movement parameter, a movement criterion, to determine whether the verification parameter meets the verification criterion comprises to determine that the verification parameter meets the verification criterion. In one or more example user equipment, in accordance with a determination that the movement parameter does not meet, based on the stored movement parameter, a movement criterion, to determine whether the verification parameter meets the verification criterion comprises to determine that the verification parameter does not meet the verification criterion.

The stored movement parameter may be indicative of a stored movement of the tracking device 500, and may be stored, such as in memory circuitry 301 of the user equipment 300. The stored movement can be set by a user of the tracking device 500. The stored movement can be particular locations and/or times at said locations. The stored movement can be movement patterns. The stored movement can be paths. The stored movement can be preset.

The movement parameter may be indicative of active movement of the tracking device 500. For example, the movement parameter may be indicative of recent movement of the tracking device 500. The movement parameter may be based on GPS data.

The user equipment can determine the movement criterion to be met if the movement parameter is similar to the stored movement parameter. For example, the user equipment 300 can determine if the movement of the tracking device 500 is similar to stored movement indicated by the stored movement parameter. The user equipment 300 can detect the presence of the tracking device 500 at regularly visited locations, such as a home and office.

Another way to further make it a poor tradeoff for criminal users to opt in for anti-stalker detection, such as a stalker response scheme, such as for detection of a rouge tracking device 500, is to make it mandatory to define locations where a user of the user equipment 300 regularly visits e.g., home and work. Regular users may already have defined locations for home and work to help with other services like navigation.

It could be mandatory that the tracking device 500 is regularly detected at these locations (to verify that they are accurate and true) to allow for application of the theft response scheme and/or non-application of the stalker response scheme. Thieves may not want to opt into locations where they live or work to enable rouge tag detection, and thieves that enter false locations will easily be detected.

In one or more example user equipment, to obtain the stored movement parameter comprises to obtain, from a user of the tracking device 500, user input indicative of the stored movement. In one or more example user equipment, to obtain the stored movement parameter is based on the user input.

For example, the user input may be indicated by a user on locations that the user of the tracking device 500 typically visits. The user may be able to input this location information into the user equipment 300.

In one or more example user equipment, to obtain the stored movement parameter comprises to determine, from a user of the tracking device 500, based on previous tracking device movement, a user profile of the user. In one or more example user equipment, to obtain the stored movement parameter is based on the user profile.

For example, the user may not need to enter their own information. The user equipment 300 may track and store movement data of the tracking device 500, such as previous tracking movement. The user equipment 300 can generate a user profile of the user of the tracking device 500. Machine learning can be used for the generation of a user profile. This profiling of user behaviour can be used to distinguish regular user from other users and disable a stalker response scheme for profiled users not behaving as regular user.

In one or more example user equipment, to determine the verification parameter comprises to obtain, from an intermediary, a verification status. In one or more example user equipment, to determine the verification parameter is based on the verification status. The intermediary may be an intermediary node, such as a database and/or a network node 400.

For example, the intermediary may be used to prevent information from being shared between the user equipment 300 and the second user equipment 300A. This may allow for improved privacy if the identity of the users 100, 100A would not want to be exposed to one another. The user equipment 300 can obtain the verification status, such as from a database and/or network node 400. In accordance with the user equipment 300 receiving a verification status indicative of a verification of the user equipment 300, the user equipment can determine that the verification parameter meets the verification criterion. In accordance with the user equipment 300 receiving a verification status indicative of no verification of the user equipment 300, the user equipment can determine that the verification parameter does not meet the verification criterion.

An intermediary may be a database and/or a network node operated by a third party company. An intermediatory may be a database and/or a network node operated by authorities, such as police.

In one or more example user equipment, to obtain the tracking parameter 20 comprises to obtain the tracking parameter 20 on a non-standardized protocol.

For example, the tracking device 500 may transmit over a non-standardized protocol, which may require supported features from the user equipment 300 and/or tracking device 500 ecosystem. The user equipment 300 may be configured to obtain the tracking parameter 20 on the non-standardized protocol. By using a non-standardized protocol, scanning applications may not be able to detect the tracking tag 500. A non-standardized protocol may be a proprietary protocol.

A non-standardized protocol may be a standardized protocol, such as Bluetooth, with intentional deviations from the standard.

For instance, a Bluetooth low energy (BLE) radio chip may be used to transmit data on a non-supported channel frequency from the tracking device 500.

In one or more example user equipment, cyclic redundancy checks (CRC) could deliberately be made corrupt so that messages are filtered out as corrupt transmissions in regular user equipment, but handled correctly by supported user equipment. If the CRC doesn't match, it throws an error so it never gets to the user's attention. An advantage to this approach is that regular hardware can be used, but changes in firmware can make a user equipment incompatible.

Figure 2:
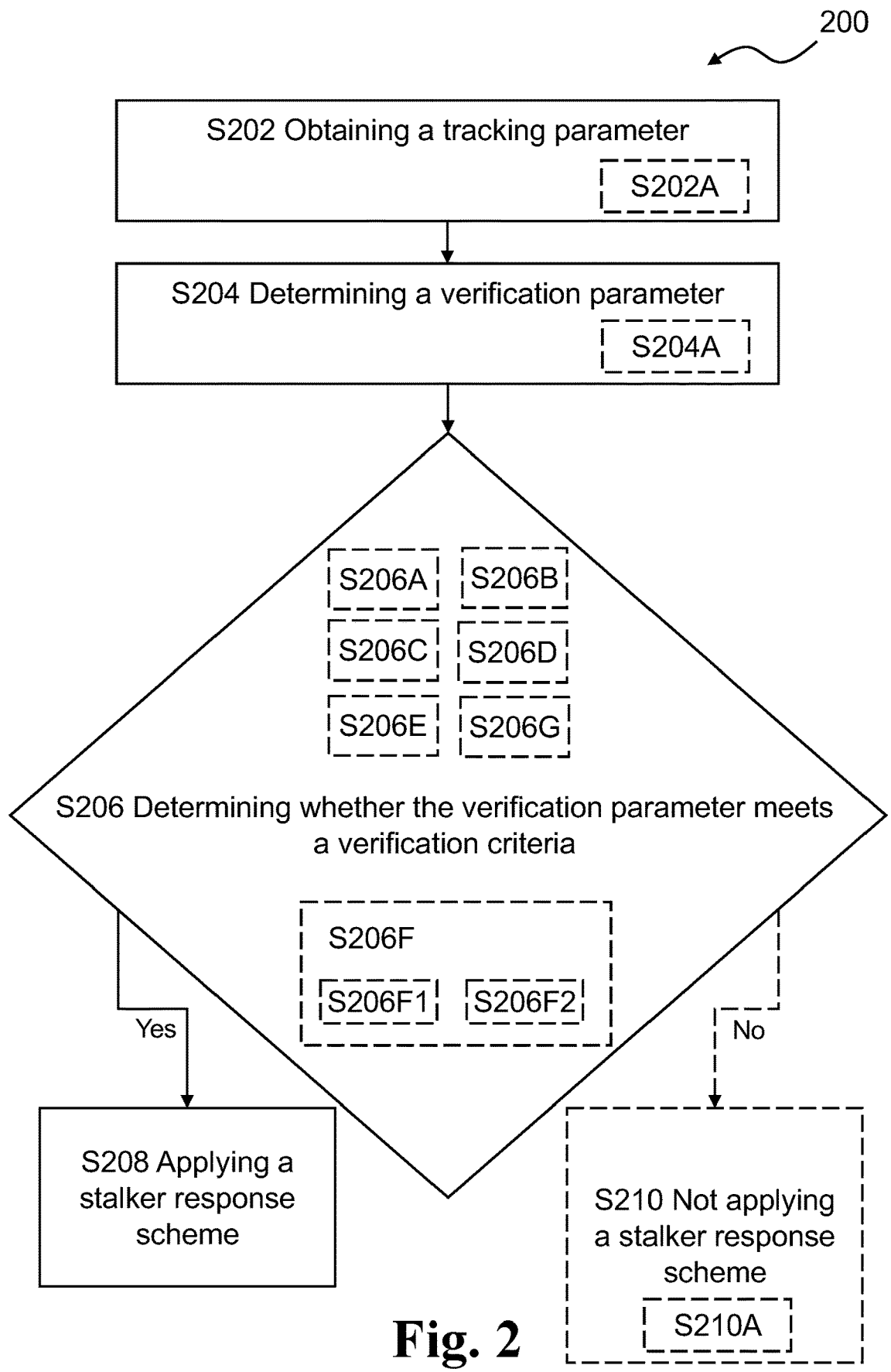
FIG. 2 is a flow-chart illustrating an example method, performed in a device, for determining an appropriate tracking device response scheme according to this disclosure.

FIG. 2 shows a flow diagram of an example method 200, performed by a device according to the disclosure, for determining an appropriate tracking device response scheme. The device is the network node and/or user equipment disclosed herein, such as network node 400 and/or user equipment 300 and/or tracking device 500 of FIG. 1, FIG. 3, and FIG. 4.

A method 200 of determining an appropriate tracking device response scheme, performed by a user equipment is disclosed. In one or more example methods, the method 200 comprises obtaining S202, from a tracking device, a tracking parameter indicative of the tracking device being within a vicinity of the user equipment. In one or more example methods, the method 200 comprises determining S204, based on the tracking parameter, a verification parameter indicative of an identity associated with the user equipment. In one or more example methods, the method 200 comprises determining S206 whether the verification parameter meets a verification criterion indicative of a stalker tracking device. In one or more example methods, the method 200 comprises, in accordance with a determination that the verification parameter meets the verification criterion, applying S208 a stalker response scheme.

In one or more example methods, the method 200 comprises, in accordance with a determination that the verification parameter does not meet the verification criterion, not applying S210 a stalker response scheme. In one or more example methods, the method 200 comprises, in accordance with a determination that the verification parameter does not meet the verification criterion, applying S210A a theft response scheme.

In one or more exemplary methods, determining S206 whether the verification parameter meets the verification criterion comprises transmitting S206A device identification data indicative of the identity associated with the user equipment to a second user equipment associated with the tracking device.

In one or more exemplary methods, determining S206 whether the verification parameter meets the verification criterion comprises receiving S206B second device identification data indicative of an identity associated with the second user equipment.

In one or more exemplary methods, determining S206 whether the verification parameter meets the verification criterion comprises obtaining S206C a lost parameter indicating that the tracking device has been lost. In one or more exemplary methods, determining S206 whether the verification parameter meets the verification criterion comprises, in accordance with a determination that the lost parameter is indicative of the tracking device being lost, determining that the verification parameter meets the verification criterion. In one or more exemplary methods, determining S206 whether the verification parameter meets the verification criterion comprises, in accordance with a determination that the lost parameter is indicative of the tracking device being lost, transmitting S206D device identification data indicative of the identity associated with the user equipment to a second user equipment associated with the tracking device.

In one or more exemplary methods, determining S206 whether the verification parameter meets the verification criterion comprises, in accordance with a determination that the lost parameter is not indicative of the tracking device being lost, determining that the verification parameter does not meet the verification criterion. In one or more exemplary methods, determining S206 whether the verification parameter meets the verification criterion, in accordance with a determination that the lost parameter is not indicative of the tracking device being lost, comprises not transmitting S206D device identification data indicative of the identity associated with the user equipment to a second user equipment associated with the tracking device.

In one or more exemplary methods, determining S206 whether the verification parameter meets the verification criterion comprises obtaining S206E a secondary tracking parameter indicative of one or more secondary tracking devices in the vicinity of the tracking device. In one or more exemplary methods, determining S206 whether the verification parameter meets the verification criterion comprises, in accordance with the secondary tracking data meeting an item threshold parameter, determining that the verification parameter does not meet the verification criterion. In one or more exemplary methods, determining S206 whether the verification parameter meets the verification criterion comprises, in accordance with the secondary tracking data not meeting an item threshold parameter, determining that the verification parameter does not meet the verification criterion.

In one or more exemplary methods, determining S206 whether the verification parameter meets the verification criterion comprises obtaining S206F a stored movement parameter indicative of stored movement of the tracking device. In one or more exemplary methods, determining S206 whether the verification parameter meets the verification criterion comprises determining S206G a movement parameter indicative of movement of the tracking device. In one or more exemplary methods, determining S206 whether the verification parameter meets the verification criterion comprises, in accordance with a determination that the movement parameter meets, based on the stored movement parameter, a movement criterion, determining that the verification parameter meets the verification criterion. In one or more exemplary methods, determining S206 whether the verification parameter meets the verification criterion comprises, in accordance with a determination that the movement parameter does not meet, based on the stored movement parameter, a movement criterion, determining that the verification parameter does not meet the verification criterion.

In one or more exemplary methods, obtaining S206F the stored movement parameter comprises obtaining S206F1, from a user of the tracking device, user input indicative of the stored movement. In one or more exemplary methods, obtaining S206F the stored movement parameter is based on user input.

In one or more exemplary methods, obtaining S206F the stored movement parameter comprises determining S206F2, from a user of the tracking device, based on previous tracking device movement, a user profile of the user. In one or more exemplary methods, obtaining S206F the stored movement parameter is based on the user profile.

In one or more exemplary methods, determining S204 the verification parameter comprises obtaining S204A, from an intermediary, a verification status. In one or more exemplary methods, determining S204 the verification parameter is based on the verification status.

In one or more exemplary methods, obtaining S202 the tracking parameter comprises obtaining S202A the tracking parameter on a non-standardized protocol.

Figure 3:
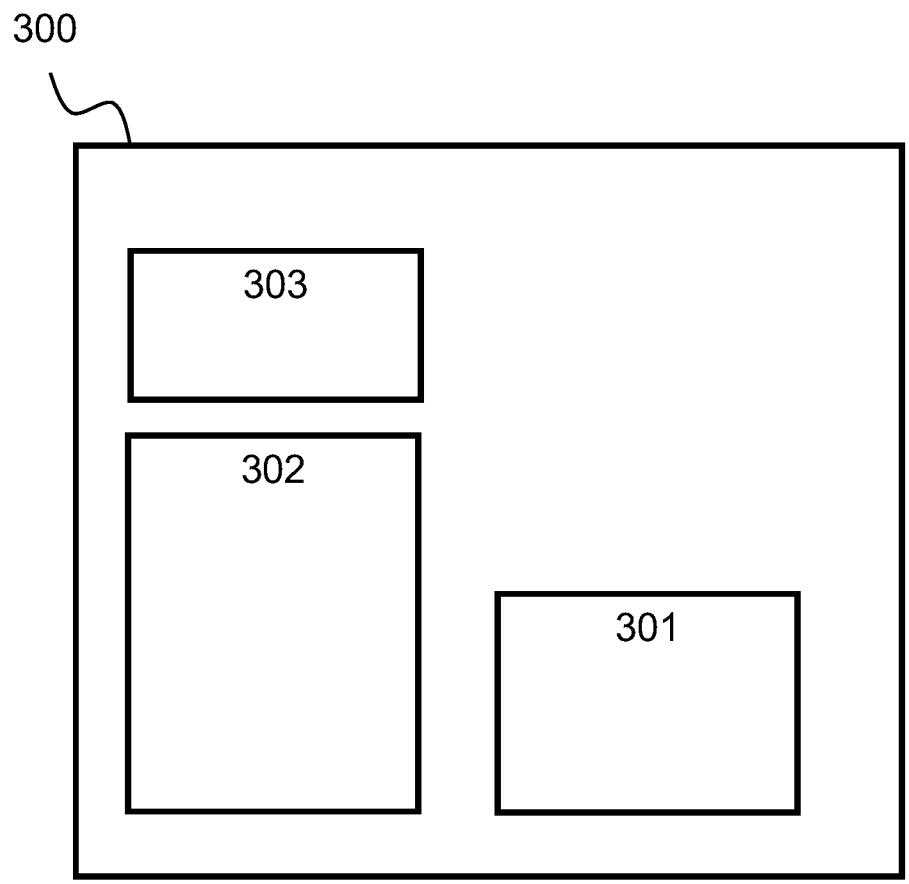
FIG. 3 is a block diagram illustrating an example user device according to this disclosure.

FIG. 3 shows a block diagram of an example user equipment 300 according to the disclosure. The user equipment 300 comprises memory circuitry 301, processor circuitry 302, and a wireless interface 303. The user equipment 300 may be configured to perform any of the methods disclosed in FIG. 2. In other words, the user equipment 300 may be configured for determining an appropriate tracking device response scheme.

The user equipment 300 is configured to communicate with a network node, such as the user equipment disclosed herein, using a wireless communication system.

The wireless interface 303 is configured for wireless communications via a wireless communication system, such as a 3GPP system, such as a 3GPP system supporting one or more of: Bluetooth, New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands.

The user equipment 300 is optionally configured to perform any of the operations disclosed in FIG. 2 (such as any one or more of S202, S204, S206, S208, S210). The operations of the user equipment 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the user equipment 300 may be considered a method that the user equipment 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 3). Memory circuitry 301 is considered a non-transitory computer readable medium.

Memory circuitry 301 may be configured to store information (such as information indicative of second set of paging resources) in a part of the memory.

Figure 4:
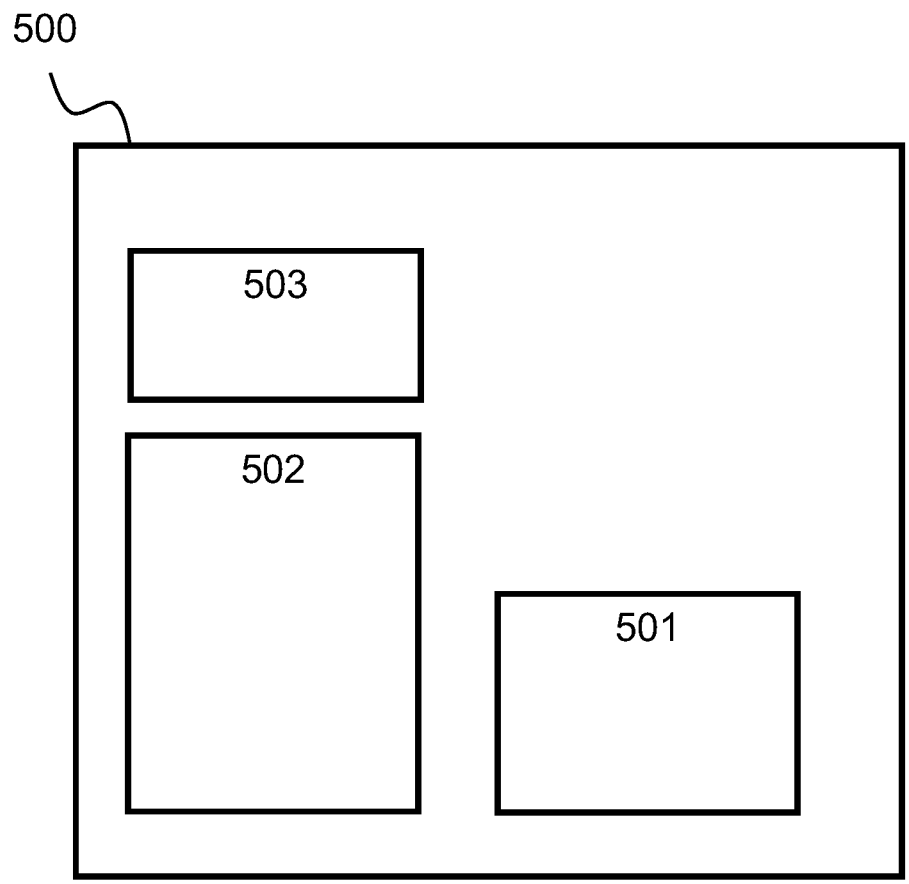
FIG. 4 is a block diagram illustrating an example tracking device according to this disclosure.

FIG. 4 shows a block diagram of an example tracking device 500 according to the disclosure. The tracking device 500 comprises memory circuitry 501, processor circuitry 502, and a wireless interface 503. The tracking device 500 may be configured to perform any of the methods disclosed in FIG. 2. In other words, the tracking device 500 may be configured for determining an appropriate tracking device response scheme.

The tracking device 500 is configured to communicate with user equipment, such as user equipment 300.

The wireless interface 503 is configured for wireless communications via a wireless communication system, such as supporting one or more of: Bluetooth, Bluetooth low energy BLE), ultra-wideband (UWB), Zigbee, Sub GHz radio, Thread, Matter, DASH7, and radiofrequency identification (RFID) active or passive.

The tracking device 500 is optionally configured to perform any of the operations disclosed in FIG. 2 (such as any one or more of S202, S204, S206, S208, S210). The operations of the tracking device 500 may be embodied in the form of executable logic routines (for example, lines of code, software programs, etc.) that are stored on a non-transitory computer readable medium (for example, memory circuitry 501) and are executed by processor circuitry 502).

Furthermore, the operations of the tracking device 500 may be considered a method that the tracking device 500 is configured to carry out. Also, while the described functions and operations may be implemented in software, such functionality may also be carried out via dedicated hardware or firmware, or some combination of hardware, firmware and/or software.

Memory circuitry 501 may be one or more of a buffer, a flash memory, a hard drive, a removable media, a volatile memory, a non-volatile memory, a random access memory (RAM), or other suitable device. In a typical arrangement, memory circuitry 501 may include a non-volatile memory for long term data storage and a volatile memory that functions as system memory for processor circuitry 502. Memory circuitry 501 may exchange data with processor circuitry 502 over a data bus. Control lines and an address bus between memory circuitry 501 and processor circuitry 502 also may be present (not shown in FIG. 4). Memory circuitry 501 is considered a non-transitory computer readable medium.

Memory circuitry 501 may be configured to store information (such as information indicative of second set of paging resources) in a part of the memory.

In one or more example tracking devices, the tracking device 500 includes memory circuitry 501. In one or more example tracking devices, the tracking device 500 includes a wireless interface 503. In one or more example tracking devices, the tracking device 500 includes processor circuitry 502. In one or more example tracking devices, the processor circuitry 502 is configured to transmit a tracking parameter indicative of the tracking device being within a vicinity of a user equipment, wherein transmitting is on a non-standardized protocol.

For example, the tracking device 500 may be configured to transmit data, such as the tracking parameter 20, over a non-standardized protocol, which may require supported features from the user equipment 300 and/or tracking device 500 ecosystem. By using a non-standardized protocol, scanning applications may not be able to detect the tracking tag 500. A non-standardized protocol may be a proprietary protocol. A non-standardized protocol may be a standardized protocol, such as Bluetooth, with intentional deviations from the standard.

For instance, a Bluetooth low energy (BLE) radio chip may be used to transmit data on a non-supported channel frequency from the tracking device 500.

In one or more example tracking devices, transmitting is via a corrupt cyclic redundancy check.

For example, cyclic redundancy checks (CRC) could deliberately be made corrupt so that messages are filtered out as corrupt transmissions in regular user equipment, but handled correctly by supported user equipment. If the CRC doesn't match, it throws an error so it never gets to the user's attention. An advantage to this approach is that regular hardware can be used, but changes in firmware can make a user equipment incompatible.

In one or more example tracking devices, the processor circuitry 502 is configured to obtain, from a user equipment, a tracking parameter indicative of the tracking device being within a vicinity of the user equipment. In one or more example tracking devices, the processor circuitry 502 is configured to determine, based on the tracking parameter, a verification parameter indicative of an identity associated with a user of the user equipment. In one or more example tracking devices, the processor circuitry 502 is configured to determine whether the verification parameter meets a verification criterion indicative of a stalker tracking device. In one or more example tracking devices, the processor circuitry 502 is configured to, in accordance with a determination that the verification parameter meets the verification criterion, apply a stalker response scheme.

In one or more example tracking devices, the processor circuitry 502 is configured to, in accordance with a determination that the verification parameter does not meet the verification criterion, not apply a stalker response scheme. In one or more example tracking devices, the processor circuitry 502 is configured to, in accordance with a determination that the verification parameter does not meet the verification criterion, apply a theft response scheme.

For example, the tracking device 500 may be a "smart" tracking device, and may be configured to be self-contained and not require a user equipment, such as user equipment 300, to take any particular actions.

Examples of methods and products (user equipment and tracking device) according to the disclosure are set out in the following items:

Item 1. A method of determining an appropriate tracking device response scheme, performed by a user equipment, the method comprising:
  obtaining, from a tracking device, a tracking parameter indicative of the tracking device being within a vicinity of the user equipment;
  determining, based on the tracking parameter, a verification parameter indicative of an identity associated with the user equipment;
  determining whether the verification parameter meets a verification criterion indicative of a stalker tracking device;
  in accordance with a determination that the verification parameter meets the verification criterion:
    applying a stalker response scheme.

Item 2. Method of item 1, wherein determining whether the verification parameter meets the verification criterion comprises:
  transmitting device identification data indicative of the identity associated with the user equipment to a second user equipment associated with the tracking device.

Item 3. Method of item 1 or item 2, wherein determining whether the verification parameter meets the verification criterion comprises:
  receiving second device identification data indicative of an identity associated with the second user equipment.

Item 4. Method of item 1, wherein determining whether the verification parameter meets the verification criterion comprises:
  obtaining a lost parameter indicating that the tracking device has been lost;
  in accordance with a determination that the lost parameter is indicative of the tracking device being lost, determining that the verification parameter meets the verification criterion; and
  transmitting device identification data indicative of the identity associated with the user equipment to a second user equipment associated with the tracking device.

Item 5. Method of any one of the previous items, wherein determining whether the verification parameter meets the verification criterion comprises:
  obtaining a secondary tracking parameter indicative of one or more secondary tracking devices in the vicinity of the tracking device; and
  in accordance with the secondary tracking data meeting an item threshold parameter, determining that the verification parameter does not meet the verification criterion.

Item 6. Method of any one of the preceding items, wherein determining whether the verification parameter meets the verification criterion comprises:
  obtaining a stored movement parameter indicative of stored movement of the tracking device;
  determining a movement parameter indicative of movement of the tracking device; and
  in accordance with a determination that the movement parameter meets, based on the stored movement parameter, a movement criterion, determining that the verification parameter meets the verification criterion.

Item 7. Method of item 6, wherein obtaining the stored movement parameter comprises:
  obtaining, from a user of the tracking device, user input indicative of the stored movement;
  wherein obtaining the stored movement parameter is based on the user input.

Item 8. Method of item 6, wherein obtaining the stored movement parameter comprises:
  determining, from a user of the tracking device, based on previous tracking device movement, a user profile of the user;
  wherein obtaining the stored movement parameter is based on the user profile.

Item 9. Method of any one of the preceding items, wherein determining the verification parameter comprises:
  obtaining, from an intermediary, a verification status;
  wherein determining the verification parameter is based on the verification status.

Item 10. Method of any one of the preceding items, wherein obtaining the tracking parameter comprises:
  obtaining the tracking parameter on a non-standardized protocol.

Item 11. Method of any one of the preceding items, wherein in accordance with a determination that the verification parameter does not meet the verification criterion, the method comprises:
  applying a theft response scheme.

Item 12. A user equipment comprising:
  memory circuitry;
  a wireless interface; and
  processor circuitry, wherein the processor circuitry is configured to:

obtain, from a tracking device, a tracking parameter indicative of the tracking device being within a vicinity of the user equipment;

determine, based on the tracking parameter, a verification parameter indicative of an identity associated with the user equipment;

determine whether the verification parameter meets a verification criterion indicative of a stalker tracking device;

in accordance with a determination that the verification parameter meets the verification criterion:

apply a stalker response scheme.

Item 13. User equipment of item 12, wherein to determine whether the verification parameter meets the verification criterion comprises to:

transmit device identification data indicative of the identity associated with the user equipment to a second user equipment associated with the tracking device.

Item 14. User equipment of any one of items 12-13, wherein to determine whether the verification parameter meets the verification criterion comprises to:

receive second device identification data indicative of an identity associated with the second user equipment.

Item 15. User equipment of item 12, wherein to determine whether the verification parameter meets the verification criterion comprises to:

obtain a lost parameter indicating that the tracking device has been lost;

in accordance with a determination that the lost parameter is indicative of the tracking device being lost, determine that the verification parameter meets the verification criterion; and transmit device identification data indicative of the identity associated with the user equipment to a second user equipment associated with the tracking device.

Item 16. User equipment of any one of items 12-15, wherein to determine whether the verification parameter meets the verification criterion comprises to:

obtain a secondary tracking parameter indicative of one or more secondary tracking devices in the vicinity of the tracking device; and in accordance with the secondary tracking data meeting an item threshold parameter, determine that the verification parameter does not meet the verification criterion.

Item 17. User equipment of any one of items 12-16, wherein to determine whether the verification parameter meets the verification criterion comprises to:

obtain a stored movement parameter indicative of stored movement of the tracking device;

determine a movement parameter indicative of movement of the tracking device; and in accordance with a determination that the movement parameter meets, based on the stored movement parameter, a movement criterion, determine that the verification parameter meets the verification criterion.

Item 18. User equipment of item 17, wherein to determine the stored movement parameter comprises to:

obtain, from a user of the tracking device, user input indicative of the stored movement;

wherein to determine the stored movement parameter is based on the user input.

Item 19. User equipment of item 17, wherein to determine the stored movement parameter comprises to:

determine, from a user of the tracking device, based on previous tracking device movement, a user profile of the user;

wherein to determine the stored movement parameter is based on the user profile.

Item 20. User equipment of any one of items 12-19, wherein to determine the verification parameter comprises:

to obtain, from an intermediary, a verification status;

wherein to determine the verification parameter is based on the verification status.

Item 21. User equipment of any one of items 12-20, wherein to the tracking parameter comprises to:

obtain the tracking parameter on a non-standardized protocol.

22. User equipment of any one of items 12-21, wherein in accordance with a determination that the verification parameter does not meet the verification criterion, the processor circuitry is be configured to apply a theft response scheme.

Item 23. A tracking device comprising:

memory circuitry;

a wireless interface; and processor circuitry, wherein the processor circuitry is configured to:

transmit a tracking parameter indicative of the tracking device being within a vicinity of a user equipment, wherein transmitting is on a non-standardized protocol.

Item 24. Tracking device of item 23, wherein transmitting is via a corrupt cyclic redundancy check.

Item 25. Tracking device of any one of items 23-24, wherein the processor circuitry is configured to:

obtain, from a user equipment, a tracking parameter indicative of the tracking device being within a vicinity of the user equipment;

determine, based on the tracking parameter, a verification parameter indicative of an identity associated with a user of the user equipment;

determine whether the verification parameter meets a verification criterion indicative of a stalker tracking device;

in accordance with a determination that the verification parameter meets the verification criterion:

apply a stalker response scheme.

Item 26. Tracking device of any one of items 23-25, wherein in accordance with a determination that the verification parameter does not meet the verification criterion, the processor circuitry is be configured to apply a theft response scheme.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed subject matter, and various changes and modifications may be made without departing from the scope of the claimed subject matter. The specification and drawings are, accordingly, to be regarded in an illustrative rather than restrictive sense. The claimed subject matter is intended to cover all alternatives, modifications, and equivalents.

What is claimed is:

1. A method of determining an appropriate tracking device response scheme, performed by a user equipment, the method comprising:
   obtaining, from a tracking device, a tracking parameter indicative of the tracking device being within a vicinity of the user equipment;
   determining, based on the tracking parameter, a verification parameter indicative of an identity associated with the user equipment;
   determining whether the verification parameter meets a verification criterion indicative of a stalker tracking device, wherein the verification criterion is whether the identity associated with the user equipment has opted-in to a stalker response scheme;
   in accordance with a determination that the verification parameter meets the verification criterion, applying a stalker response scheme; and
   in accordance with a determination that the verification parameter does not meet the verification criterion, applying a theft response scheme.

2. The method according to claim 1, wherein determining whether the verification parameter meets the verification criterion comprises:
   receiving second device identification data indicative of an identity associated with a second user equipment.

3. The method according to claim 1, wherein determining whether the verification parameter meets the verification criterion comprises:
   obtaining a lost parameter indicating that the tracking device has been lost;
   in accordance with a determination that the lost parameter is indicative of the tracking device being lost, determining that the verification parameter meets the verification criterion; and
   transmitting device identification data indicative of the identity associated with the user equipment to a second user equipment associated with the tracking device.

4. The method according to claim 1, wherein determining whether the verification parameter meets the verification criterion comprises:

obtaining a secondary tracking parameter indicative of one or more secondary tracking devices in the vicinity of the tracking device; and in accordance with the secondary tracking data meeting an item threshold parameter, determining that the verification parameter does not meet the verification criterion.

5. The method according to claim 1, wherein determining whether the verification parameter meets the verification criterion comprises:

obtaining a stored movement parameter indicative of stored movement of the tracking device;

determining a movement parameter indicative of movement of the tracking device; and in accordance with a determination that the movement parameter meets, based on the stored movement parameter, a movement criterion, determining that the verification parameter meets the verification criterion.

6. The method according to claim 5, wherein obtaining the stored movement parameter comprises:

obtaining, from a user of the tracking device, user input indicative of the stored movement;

wherein obtaining the stored movement parameter is based on the user input.

7. The method according to claim 5, wherein obtaining the stored movement parameter comprises:

determining, from a user of the tracking device, based on previous tracking device movement, a user profile of the user;

wherein obtaining the stored movement parameter is based on the user profile.

8. The method according to claim 1, wherein determining the verification parameter comprises:

obtaining, from an intermediary, a verification status;

wherein determining the verification parameter is based on the verification status.

9. The method according to claim 1, wherein obtaining the tracking parameter comprises:

obtaining the tracking parameter on a non-standardized protocol.

10. The method according to claim 1, wherein determining whether the verification parameter meets the verification criterion comprises:

transmitting device identification data indicative of the identity associated with the user equipment to a second user equipment associated with the tracking device.

11. A user equipment comprising:
memory circuitry;
a wireless interface; and
processor circuitry, wherein the processor circuitry is configured to:
obtain, from a tracking device, a tracking parameter indicative of the tracking device being within a vicinity of the user equipment;
determine, based on the tracking parameter, a verification parameter indicative of an identity associated with the user equipment;
determine whether the verification parameter meets a verification criterion indicative of a stalker tracking device, wherein the verification criterion is whether the identity associated with the user equipment has opted-in to a stalker response scheme;
in accordance with a determination that the verification parameter meets the verification criterion, apply a stalker response scheme; and in accordance with a determination that the verification parameter does not meet the verification criterion, apply a theft response scheme.

12. The user equipment according to claim 11, wherein to determine whether the verification parameter meets the verification criterion comprises to:

transmit device identification data indicative of the identity associated with the user equipment to a second user equipment associated with the tracking device.

13. The user equipment according to claim 11, wherein to determine whether the verification parameter meets the verification criterion comprises to:

receive second device identification data indicative of an identity associated with the second user equipment.

14. The user equipment according to claim 11, wherein to determine whether the verification parameter meets the verification criterion comprises to:

obtain a lost parameter indicating that the tracking device has been lost;

in accordance with a determination that the lost parameter is indicative of the tracking device being lost, determine that the verification parameter meets the verification criterion; and transmit device identification data indicative of the identity associated with the user equipment to a second user equipment associated with the tracking device.

15. The user equipment according to claim 11, wherein to determine whether the verification parameter meets the verification criterion comprises to:

obtain a secondary tracking parameter indicative of one or more secondary tracking devices in the vicinity of the tracking device; and in accordance with the secondary tracking data meeting an item threshold parameter, determine that the verification parameter does not meet the verification criterion.

16. The user equipment according to claim 11, wherein to determine whether the verification parameter meets the verification criterion comprises to:

obtain a stored movement parameter indicative of stored movement of the tracking device;

determine a movement parameter indicative of movement of the tracking device; and in accordance with a determination that the movement parameter meets, based on the stored movement parameter, a movement criterion, determine that the verification parameter meets the verification criterion.

17. The user equipment according to claim 16, wherein to determine the stored movement parameter comprises to:

obtain, from a user of the tracking device, user input indicative of the stored movement;

wherein to determine the stored movement parameter is based on the user input.

18. The user equipment according to claim 16, wherein to determine the stored movement parameter comprises to:

determine, from a user of the tracking device, based on previous tracking device movement, a user profile of the user;

wherein to determine the stored movement parameter is based on the user profile.

19. The user equipment according to claim 11, wherein to determine the verification parameter comprises:

to obtain, from an intermediary, a verification status;

wherein to determine the verification parameter is based on the verification status.

20. The user equipment according to claim 11, wherein to the tracking parameter comprises to:

obtain the tracking parameter on a non-standardized protocol.

\* \* \* \* \*